United States Patent
Doh

(10) Patent No.: US 9,604,617 B2
(45) Date of Patent: Mar. 28, 2017

(54) HYDRAULIC BRAKE SYSTEM

(71) Applicant: MANDO CORPORATION, Pyeongtaek-si, Gyeonggi-do (KR)

(72) Inventor: Yoon-Ho Doh, Yongin-si (KR)

(73) Assignee: MANDO CORPORATION, Geonggi-do (KR)

( * ) Notice: Subject to any disclaimer, the term of this patent is extended or adjusted under 35 U.S.C. 154(b) by 37 days.

(21) Appl. No.: 14/699,773

(22) Filed: Apr. 29, 2015

(65) Prior Publication Data

US 2015/0314764 A1 Nov. 5, 2015

(30) Foreign Application Priority Data

Apr. 30, 2014 (KR) .......................... 10-2014-0052329

(51) Int. Cl.
*B60T 13/16* (2006.01)
*B60T 13/14* (2006.01)
(Continued)

(52) U.S. Cl.
CPC ............ *B60T 13/142* (2013.01); *B60T 7/042* (2013.01); *B60T 8/4068* (2013.01);
(Continued)

(58) Field of Classification Search
CPC .... B60T 13/142; B60T 13/161; B60T 13/168; B60T 13/686; B60T 8/4068;
(Continued)

(56) References Cited

U.S. PATENT DOCUMENTS 4,919,495 A * 4/1990 Kircher ................... B60T 8/445
188/152
6,003,957 A * 12/1999 Toda ..................... B60T 8/4059
303/10

(Continued)

FOREIGN PATENT DOCUMENTS

KR 20-0267460 Y1 3/2002

*Primary Examiner* — Pamela Rodriguez
(74) *Attorney, Agent, or Firm* — McDermott Will & Emery LLP

(57) ABSTRACT

Disclosed is a hydraulic brake system comprising a master cylinder forming a braking hydraulic pressure according to an operation of a brake pedal, wheel brakes provided at a front wheel and a rear wheel, respectively, to provide a braking force by receiving the braking hydraulic pressure of the master cylinder, solenoid valves provided at an inlet side and an outlet side of each of the wheel brakes to control a flow of the braking hydraulic pressure, a low pressure accumulator temporarily storing oil discharged from the wheel brake during a pressure reducing braking in which the solenoid valve operates, a pump configured to compress oil stored in the low pressure accumulator such that the oil is discharged toward the wheel brake or the master cylinder according to a demand, and an orifice provided at an outlet side of the pump, wherein the orifice includes an outer case and an inner case provided to form a space between the outer case and the inner case while assembled to the outer case, a first oil passage passing through the inner case, and a second oil passage provided in the space between the outer case and the inner case, and the first oil passage and the second oil passage have lengths different from each other.

11 Claims, 4 Drawing Sheets

(51) Int. Cl.
   *B60T 7/04*      (2006.01)
   *B60T 13/66*     (2006.01)
   *B60T 13/68*     (2006.01)
   *B60T 8/40*      (2006.01)
   *B60T 8/48*      (2006.01)

(52) U.S. Cl.
   CPC .......... *B60T 8/4872* (2013.01); *B60T 13/146* (2013.01); *B60T 13/161* (2013.01); *B60T 13/168* (2013.01); *B60T 13/662* (2013.01); *B60T 13/686* (2013.01)

(58) Field of Classification Search
   CPC ........ B60T 8/365; B60T 8/445; B60T 8/4059; B60T 8/4031; B60T 13/146; B60T 13/662; B60T 8/4872; B60T 7/042
   USPC ... 303/10, 11, 115.4, 116.1, 119.1, 155, 157, 303/158
   See application file for complete search history.

(56) References Cited

U.S. PATENT DOCUMENTS

| | | | |
|---|---|---|---|
| 7,144,091 B2 * | 12/2006 | Inage ................ | B60T 8/365 303/10 |
| 2005/0088039 A1 * | 4/2005 | Yang ................ | B60T 8/4031 303/11 |
| 2010/0319334 A1 * | 12/2010 | Kley ................ | B60T 8/4068 60/325 |
| 2016/0001754 A1 * | 1/2016 | Kim ................ | B60T 13/148 303/87 |

* cited by examiner

HYDRAULIC BRAKE SYSTEM

CROSS-REFERENCE TO RELATED APPLICATION

This application claims the benefit of Korean Patent Application No. 2014-0052329, filed on Apr. 30, 2014 in the Korean Intellectual Property Office, the disclosure of which is incorporated herein by reference.

BACKGROUND

1. Field

Embodiments of the present disclosure relate to a hydraulic brake system, and more particularly, to a hydraulic brake system for reducing pressure pulsation that is generated during operation of a pump.

2. Description of the Related Art

A hydraulic brake system is installed in a vehicle as an essential element to perform a braking operation. In recent years, various brake systems have been suggested to provide more strong and stable braking force.

Examples of the hydraulic brake system include an Anti-Lock Brake System (ABS) for preventing skid of wheels at the time of the braking, a brake traction control system (BTCS) for preventing slip of driving wheels at the time of a sudden acceleration incident or an unintended acceleration, and a vehicle dynamic control system (VDC) implemented as a combination of an ABS system and a traction control to maintain a stable driving state of a vehicle by controlling a liquid pressure of a brake.

Such a brake system includes a master cylinder that generates a required pressure for braking, a plurality of solenoid valves that control a braking hydraulic pressure transmitted to wheel brake sides, a low pressure accumulator that temporality stores oil, a pump and a motor that are configured to forcedly pump the oil temporarily stored in the low pressure accumulator, an orifice that reduces pressure pulsation of oil pumped by the pump, and an electronic control unit (ECU) that electrically controls operations of the solenoid valves and the pump. A valve assembly of the solenoid valves, the accumulator, the pump and the motor are installed in a hydraulic block (a modulator block), which is formed of aluminum, in a compact manner. The ECU is coupled to the hydraulic block while having an ECU housing in which a circuit board and a coil assembly of the solenoid valves are accommodated.

In the conventional brake system, a pump operation during a process of raising a braking pressure may generate a sudden pressure pulsation, which may be reduced by an orifice provided at an outlet side of the pump. However, the orifice only has a structure of reducing damping by adjusting a cross section of an oil passage, and thus there is a limitation as to reduce the pressure pulsation.

PRIORITY ART DOCUMENT

Korean Utility Model Registration No. 20-0267460 (Sep. 27, 2002).

The above document discloses a construction of reducing a pressure pulsation generated by a pump operation, by using a subsidiary damper that is provided in parallel to a high pressure accumulator. However, such a construction requires a space larger than a predetermined size in order to install the high pressure accumulator and the subsidiary damper in a hydraulic block, which increases the size of the hydraulic block. In addition, there is a need to process an oil passage connecting the high pressure accumulator to the subsidiary damper, which complicates the manufacturing process.

SUMMARY

Therefore, it is an aspect of the present disclosure to provide a hydraulic brake system for effectively reducing a pressure pulsation that is generated during a pump operation.

Additional aspects of the invention will be set forth in part in the description which follows and, in part, will be obvious from the description, or may be learned by practice of the disclosure.

In accordance with one aspect of the present disclosure, a hydraulic brake system comprising a master cylinder forming a braking hydraulic pressure according to an operation of a brake pedal, wheel brakes provided at a front wheel and a rear wheel, respectively, to provide a braking force by receiving the braking hydraulic pressure of the master cylinder, solenoid valves provided at an inlet side and an outlet side of each of the wheel brakes to control a flow of the braking hydraulic pressure, a low pressure accumulator temporarily storing oil discharged from the wheel brake during a pressure reducing braking in which the solenoid valve operates, a pump configured to compress oil stored in the low pressure accumulator such that the oil is discharged toward the wheel brake or the master cylinder according to a demand, and an orifice provided at an outlet side of the pump, wherein the orifice includes an outer case, an inner case, a first oil passage and a second oil passage. The inner case may be provided to form a space between the outer case and the inner case while assembled to the outer case. The first oil passage may pass through the inner case. The second oil passage may be provided in the space between the outer case and the inner case. The first oil passage and the second oil passage may have lengths different from each other.

The first oil passage may be provided at a center of the inner case.

The outer case may be provided in the form of a cylinder having one side thereof open, and the inner case may include a rod part configured to be spaced apart from an inner wall of the outer case to form a space when coupled to the outer case, and a flange having the same outer diameter as an outer diameter of the outer case and coupled to the outer case.

The outer case and the inner case may be forcedly press-fitted with each other, and an end portion of the rod part may come into close contact with a bottom of the outer case while coupled to each other, such that the first oil passage is separated from the second oil passage.

The outer case may include a first inlet provided at a center of the bottom of the outer case and a second inlet provided at a periphery of the bottom of the outer case while apart from the first inlet.

The second oil passage may be provided in a spiral shape.

In accordance with another aspect of the present disclosure, a hydraulic brake system comprising a master cylinder forming a braking hydraulic pressure according to an operation of a brake pedal, wheel brakes provided at a front wheel and a rear wheel, respectively, to provide a braking force by receiving the braking hydraulic pressure of the master cylinder, solenoid valves provided at an inlet side of and an exist side of each of the wheel brakes to control a flow of a braking hydraulic pressure, a low pressure accumulator temporarily storing oil discharged from the wheel brake during a pressure reducing braking in which the solenoid valve operates, a pump configured to compress oil stored in the low pressure accumulator such that the oil is discharged toward the wheel brake or the master cylinder according to a demand, and an orifice provided at an outlet side of the pump, wherein the orifice includes a first oil passage and a second oil passage. The second oil passage may have lengths different from each other. The first oil passage may pass through the orifice, and the second oil passage may be provided in a space formed between an outer circumference of the orifice and a hydraulic block in which the orifice is installed.

As is apparent from the above, the hydraulic brake system according to the embodiment of the present disclosure can offset a liquid pulsation by forming a plurality of oil passages each having a different length in an orifice so as to generate a difference between speeds of fluids that pass through the orifice.

In addition, the hydraulic brake system according to the embodiment of the present disclosure can remove a predetermined frequency range of noise by adjusting the length and diameter of an oil passage provided in an orifice so as to shift a pulsation frequency component.

In addition, the hydraulic brake system according to the embodiment of the present disclosure can easily process and assemble a hydraulic block by forming an orifice to have a simple external appearance.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
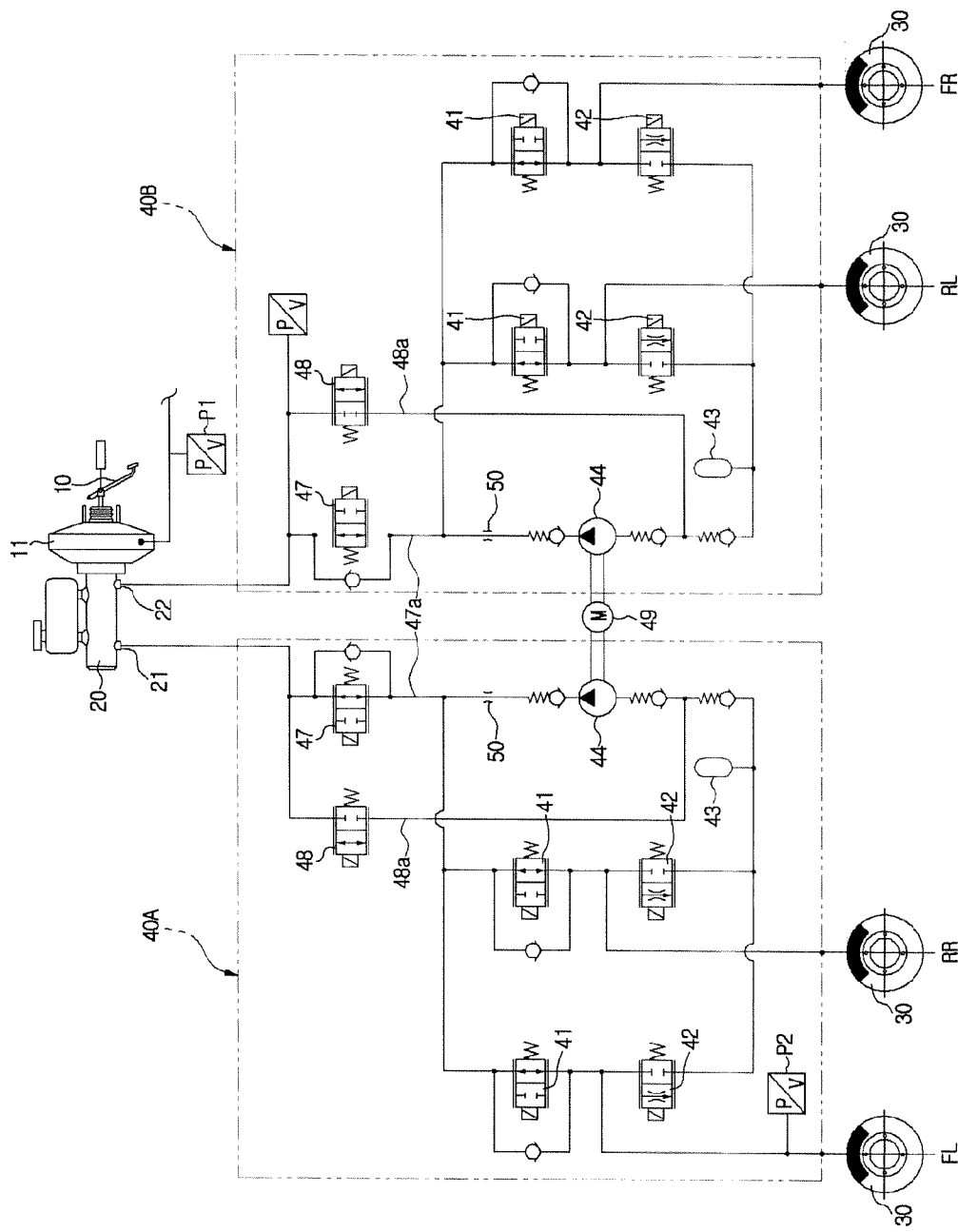
FIG. 1 is a view illustrating a hydraulic brake system according to an embodiment of the present disclosure.

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

A hydraulic brake system according to an embodiment of the present disclosure includes a brake pedal 10 that receives an operation force of a driver, a brake booster 11 that allows a pedal force of the brake pedal 10 to be doubled by using a pressure difference between a vacuum pressure and the atmospheric pressure, a master cylinder 20 that generates a pressure from the brake booster 11, a first hydraulic circuit 40A that connects a first port 21 of the master cylinder 20 to two wheel brakes (or two wheel cylinders) 30 so as to control transmission of a liquid pressure, and a second hydraulic circuit 40B that connects a second port 22 of the master cylinder 20 to the remaining wheel brakes 30 so as to control transmission of a liquid pressure. The first hydraulic circuit 40A and the second hydraulic circuit 40B are provided in a hydraulic block (not shown) in a compact manner.

Each of the first and second hydraulic circuits 40A and 40B includes solenoid valves 41 and 42 that control a braking hydraulic pressure transmitted to two wheel cylinders 30 side, pumps 44 that suck and pump oil discharged from the wheel cylinder side or oil from the master cylinder 20, a low pressure accumulator 43 that temporarily stores the oil discharged from the wheel cylinder 30 and an orifice 50 that reduce a pressure pulsation from the liquid pressure pumped by the pump 44.

The plurality of solenoid valves 41 and 42 are in conjunction with upstream and downstream sides of the wheel brakes 30, and include a normal open type solenoid valve 41 that is disposed on the upstream side of the wheel brake 30 and remains normally opened and a normal closed type solenoid valve 42 that is disposed on the downstream side of the wheel brake 30 and remains normally closed. Opening and closing operations of the solenoid valves 41 and 42 may be controlled by an electronic control unit (ECU: not shown) that senses a vehicle speed through a wheel speed sensor disposed each of the wheels, and the normal closed type solenoid valve 42 is opened in accordance with pressure reducing braking, so that oil discharged from the wheel brake 30 may be temporarily stored in the low pressure accumulator 43.

The pump 44 may be driven by a motor 49 so as to suck oil stored in the low pressure accumulator 43, and discharge the sucked oil toward the orifice 50 therefore a liquid pressure is transmitted to the wheel brake 30 or the master cylinder 20.

In addition, in a main oil passage 47a for connecting the master cylinder 20 and an outlet of the pump 44, a normal open type solenoid valve 47 (hereinafter referred to as "TC valve") for traction control (TCS) is provided. The TC valve 47 remains normally opened, and allows a braking liquid pressure formed in the master cylinder 20 at the time of general braking through the brake pedal 10 to be transmitted to the wheel brake 30 through the main oil passage 47a.

In addition, an auxiliary oil passage 48a is branched from the main oil passage 47a, and guides oil of the master cylinder 20 to be sucked into the inlet side of the pump 44. In the auxiliary oil passage 48a, a shuttle valve 48 for causing the oil to flow only to the inlet of the pump 44 is provided. The shuttle valve 48 that is electrically operated is provided in the middle of the auxiliary oil passage 48a so that the shuttle valve 48 is normally closed but opened in a TCS mode.

Meanwhile, a pressure sensor P1 is installed on the brake booster 11 to detect a vacuum pressure and the atmospheric pressure of the brake booster 11, and a wheel pressure sensor P2 is provided to detect actual braking pressure applied to the front wheels FL and FR and the rear wheels RL and RR. The pressure sensors P1 and P2 are electrically connected to the ECU and thus controlled by the ECU.

Figure 2:
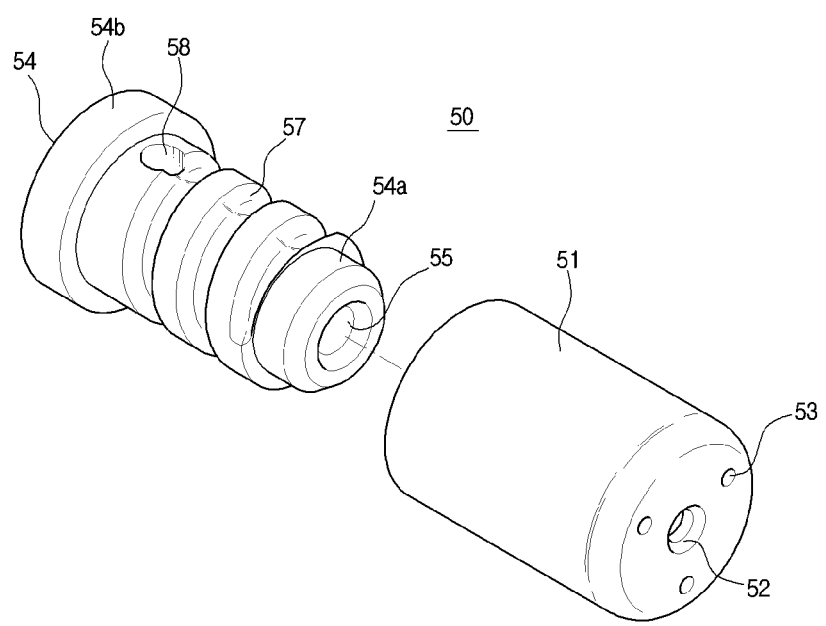
FIG. 2 is an exploded view illustrating an orifice of a hydraulic brake system according to an embodiment of the present disclosure.
Figure 3:
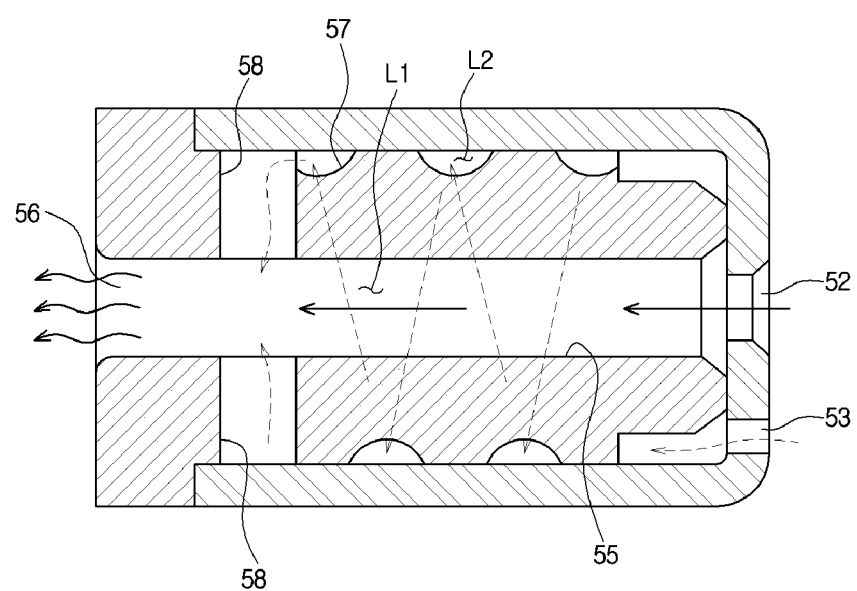
FIG. 3 is a cross sectional view illustrating an orifice of a hydraulic brake system according to an embodiment of the present disclosure.

FIGS. 2 and 3 illustrate the orifice 50 according to an embodiment of the present disclosure, which is configured to reduce a pressure pulsation of a liquid pressure pumped by the pump 44.

For example, the orifice 50 includes an outer case 51 and an inner case 54 accommodated in the outer case 51.

The outer case 51 is provided in the form of a cylinder so as to be easily installed in the hydraulic block. The outer case 51 is provided in the form of a cup, having one side thereof closed and the other side thereof open. At least two inlets including a first inlet 52 and a second inlet 53 are provided through a lower bottom of the outer case 51. The first inlet 52 is provided at the center of the lower bottom, and the second inlet 53 is provided in a plurality thereof at a periphery of the bottom. The number and diameter of each of the first inlet 52 and the second inlets 53 may be adjusted for distribution of flow rate.

The inner case 54 is coupled to the open lower side of the outer case 51 in a forcedly press-fitting manner, to close an inner space of the outer case. The inner case 54 includes a rod 54a and a flange 54b that is provided at an end portion of the rod 54a. The rod 54a has a body smaller than an inner diameter of the outer case 51 to form a space while being spaced apart from an inner wall of the outer case 51 when the rod 54a is coupled to the outer case 51, and the flange 54b has the same outer diameter as that of the outer case 51, and thus easily installed in the hydraulic block. In addition, an end of the rod 54a is configured to come into close contact with the bottom of the outer case 51 when the rod 54a is coupled to the outer case 51, so that oil introduced into the orifice 50 through the first inlet 52 is separated from oil introduced into the orifice 50 through the second inlet 53.

The inner case 54 is provided with a penetration hole 55 at the center thereof. One end of the penetration hole 55 is connected to an outlet side of the pump 44 while communicating with the first inlet 52 of the outer case 51, and the other end of the penetration hole 55, corresponding to a side of the inner case 54 at which the flange 54b is positioned, forms an outlet 56 so as to be connected to the master cylinder side main oil passage 47a.

The penetration hole 55 provided at the center of the inner case 54 forms a first oil passage L1, and a space between an outer circumference of the inner case 54 and an inner wall of the outer case 51 forms a second oil passage L2. Oil passing through the second inlets 53 concentrically disposed at the periphery of the bottom of the outer case 51 join by passing through the second oil passage L2.

The first oil passage L1 and the second oil passage L2 have different lengths along which oil moves from one end to the other end. For example, the first oil passage L1 is provided in a shape of a straight line, and the second oil passage L2 is provided in the form of a curved bypass, for example, a spiral shape, by processing a spiral groove 57 in an outer circumferential surface of the inner case 54. That is, the second oil passage L2 extends to have a length longer than a length of the first oil passage L1, so there is a difference between speeds of fluids passing through the first oil passage L1 and the second oil passage L2, respectively, thereby offsetting a fluid pulsation.

The rod 54a is provided with a through hole 58 at an end portion thereof adjacent to the flange 54a. The through hole 58 is formed by radially passing through the inner case 54, and is configured to communicate the second oil passage L2 provided at the outer circumference of the inner case 54 with the first oil passage L1 provided at the center of the inner case 43, and thus is connected to the outlet 56.

Although the second oil passage L2 according to the embodiment of the present disclosure is illustrated as having a spiral shape, the present disclosure is not limited thereto. For example, the second oil passage L2 may be provided in various shapes as long as it has a distance different from that of the first oil passage L1. In addition, with regard to a second oil passage having a spiral shape, a pitch and a size (an aperture) of the second oil passage may be adjusted to offset a pulsation frequency component. In addition, a pulsation frequency component is shifted by forming the second oil passage through such an adjustment of the pitch and size, a certain frequency band of noise may be removed.

As for the orifice according to the embodiment of the present disclosure, the outer case is made of metal through forging, and the inner case is made of metal through a form rolling, so that the manufacturing cost is significantly reduced.

The following description will be made in relation to a braking operation of a hydraulic brake system for a vehicle according to the present disclosure.

First, a driver steps on a brake pedal 10 to decelerate or stop a vehicle while driving or to remain in a stop state. According to the pedaling, the brake booster 11 generates a boosting force, which is amplified from an input of the brake booster 11, and a master cylinder 20 generates a braking pressure having a considerable pressure by receiving the amplified force from the brake booster 11. The braking hydraulic pressure is fed into the front wheels FL and FR and the rear wheels RL and RR through the solenoid valve 41, thereby performing the braking operation. A driver gradually or completely removes a foot from the brake pedal 10, pressure of oil in each wheel brake is returned to the master cylinder 20 through the solenoid valve 41, so that the braking force is reduced or the braking operation is cancelled.

Meanwhile, at the braking operation, one pair of the pumps 44 driven with a phase difference of about 180 degrees by the motor 49 may cause a pressure pulsation having a regular half sine wave in the hydraulic brake system, and the pressure pulsation may be attenuated by the orifice 50.

That is, as for the pressure of oil discharged through an outlet side of the pump 44, most of the pressure pulsation is attenuated due to a difference between speeds of oil that pass through the first oil passage L1 and the second oil passage L2 of the orifice 50 that have different lengths from each other in the orifice 50. Accordingly, the oil pressure having become uniform is transferred toward the master cylinder 20 or the solenoid valve 41.

Figure 4:
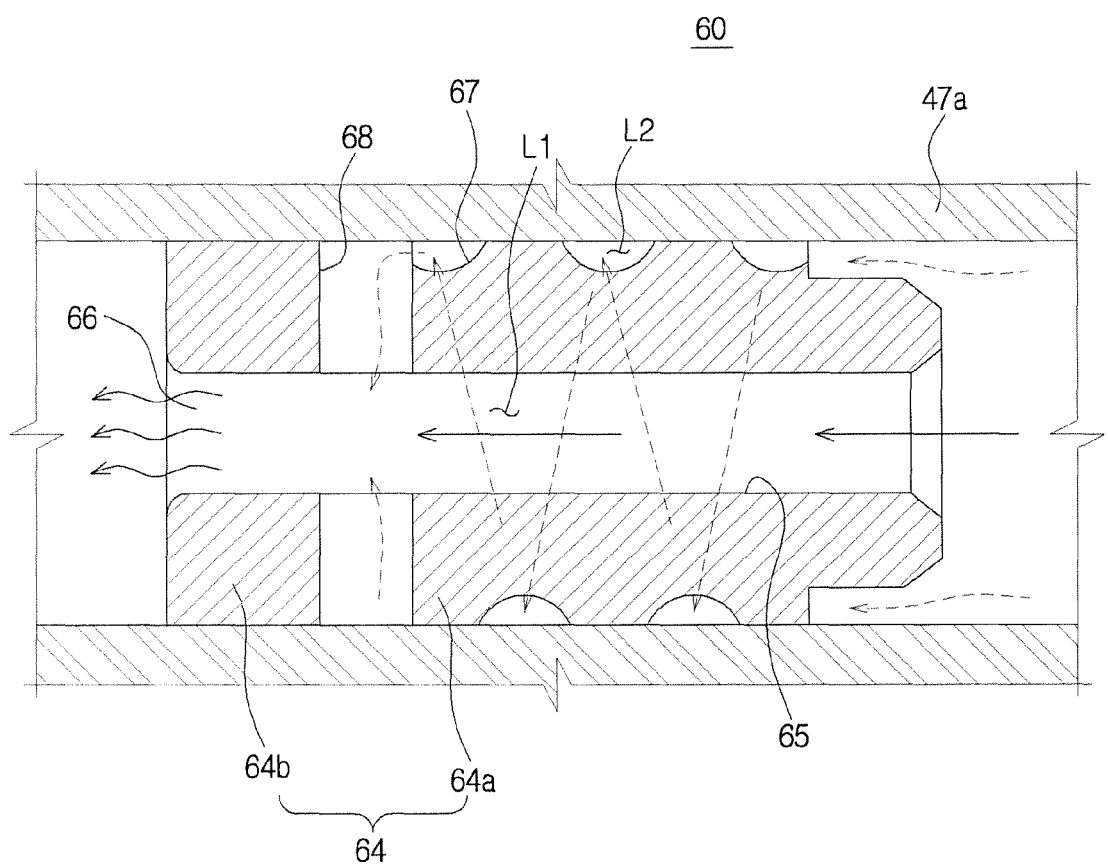
FIG. 4 is a cross sectional view illustrating an orifice of a hydraulic brake system according to another embodiment of the present disclosure.

FIG. 4 is a cross sectional view illustrating an orifice of a hydraulic brake system according to another embodiment of the present disclosure. The following description will be made on a difference from the previous embodiment, and details of parts identical to those of the previous embodiment will be omitted in order to avoid redundancy.

When compared with the previous embodiment of the present disclosure, an orifice 60 according to the present embodiment has an inner case 64 insertedly installed in an oil passage of a hydraulic block, and an outer case is omitted from the orifice 60. To this end, an outer diameter of a rod 64a of the inner case 64 and an outer diameter of a flange 64b of the inner case 64 are provided to be the same as a diameter of a main oil passage 47a formed in the hydraulic block.

Accordingly, a penetration hole 65 in the inner case 64 installed in the oil passage of the hydraulic block forms a first oil passage L1, and a space between an outer circumference of the inner case 64 and the oil passage of the hydraulic block forms a second oil passage L2, and a through hole 68 radially passing through the inner case 64 allows the second oil passage L2 formed at the outer circumference of the inner case 64 to communicate with the first oil passage L1 provided at the center of the inner case 64, so that the two oil passages L1 and L2 join at an outlet 66.

For example, the first oil passage L1 is provided in a shape of a straight line, and the second oil passage L2 is provided in the form of a curved bypass, for example, a spiral shape, by processing a spiral groove 67 in an outer circumferential surface of the inner case 64.

By the characteristics of the hydraulic block formed of aluminum, an orifice, processed at a poor precision, may cause the hydraulic block to be ground and foreign substances generated due to the grinding may be infiltrated into the oil passages L1 and L2. Accordingly, the orifice needs to be processed at a high precision.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A hydraulic brake system comprising a master cylinder forming a braking hydraulic pressure according to an operation of a brake pedal, wheel brakes provided at a front wheel and a rear wheel, respectively, to provide a braking force by receiving the braking hydraulic pressure of the master cylinder, solenoid valves provided at an inlet side and an outlet side of each of the wheel brakes to control a flow of the braking hydraulic pressure, a low pressure accumulator temporarily storing oil discharged from the wheel brakes during a pressure reducing braking in which the solenoid valves operate, a pump configured to compress oil stored in the low pressure accumulator such that the oil is discharged toward the wheel brakes or the master cylinder according to a demand, and an orifice provided at an outlet side of the pump, wherein the orifice comprises:
    an outer case and an inner case provided to form a space between the outer case and the inner case while assembled to the outer case;
    a first oil passage passing from the outer case through the inner case; and
    a second oil passage formed on an outer circumferential surface of the inner case and provided in the space between the outer case and the inner case, and
    the first oil passage and the second oil passage have lengths different from each other.

2. The hydraulic brake system of claim 1, wherein the first oil passage is provided at a center of the inner case.

3. The hydraulic brake system of claim 1, wherein:
    the outer case is provided in the form of a cylinder having one side thereof open, and
    the inner case includes a rod part configured to be spaced apart from an inner wall of the outer case to form a space when coupled to the outer case, and a flange having the same outer diameter as an outer diameter of the outer case and coupled to the outer case.

4. The hydraulic brake system of claim 3, wherein:
    the outer case and the inner case are forcedly press-fitted with each other; and
    an end portion of the rod part comes into close contact with a bottom of the outer case while coupled to each other, such that the first oil passage is separated from the second oil passage.

5. The hydraulic brake system of claim 4, wherein the outer case includes a first inlet provided at a center of the bottom of the outer case and a second inlet provided at a periphery of the bottom of the outer case while apart from the first inlet.

6. The hydraulic brake system of claim 1, wherein the second oil passage is provided in a spiral shape.

7. The hydraulic brake system of claim 1, wherein the orifice is provided with a through hole to communicate the first oil passage with the second oil passage.

8. The hydraulic brake system of claim 7, wherein oil passing through the first oil passage and the second oil passage is discharged through an outlet of the first oil passage.

9. The hydraulic brake system of claim 1, wherein the outer case comprises:
    a first inlet connected to the first oil passage; and
    a second inlet connected to the second oil passage.

10. A hydraulic brake system comprising a master cylinder forming a braking hydraulic pressure according to an operation of a brake pedal, wheel brakes provided at a front wheel and a rear wheel, respectively, to provide a braking force by receiving the braking hydraulic pressure of the master cylinder, solenoid valves provided at an inlet side of and an exit side of each of the wheel brakes to control a flow of a braking hydraulic pressure, a low pressure accumulator temporarily storing oil discharged from the wheel brakes during a pressure reducing braking in which the solenoid valves operate, a pump configured to compress oil stored in the low pressure accumulator such that the oil is discharged toward the wheel brakes or the master cylinder according to a demand, and an orifice provided at an outlet side of the pump, wherein the orifice comprises:
    a first oil passage and a second oil passage that have lengths different from each other, and
    the first oil passage passes through the orifice, and the second oil passage is formed on the outer circumferential surface of the inner case and provided in a space formed between an outer circumference of the orifice and a hydraulic block in which the orifice is installed.

11. The hydraulic brake system of claim 10, wherein the first oil passage is provided at a center of the orifice.

* * * * *